(12) United States Patent
Maeuser et al.

(10) Patent No.: US 7,026,577 B2
(45) Date of Patent: Apr. 11, 2006

(54) HEATED PANE WITH AN ELECTRICALLY-CONDUCTIVE SURFACE COATING

(75) Inventors: Helmut Maeuser, Herzogenrath (DE); Richard Crumbach, Aachen (DE); Manfred Jansen, Geilenkirchen (DE); Andreas Sznerski, Baeseweiler (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/496,312

(22) PCT Filed: Dec. 11, 2002

(86) PCT No.: PCT/FR02/04281

§ 371 (c)(1),
(2), (4) Date: Jun. 3, 2004

(87) PCT Pub. No.: WO03/051088

PCT Pub. Date: Jun. 19, 2003

(65) Prior Publication Data

US 2005/0045613 A1 Mar. 3, 2005

(30) Foreign Application Priority Data

Dec. 11, 2001 (DE) ................. 101 60 806

(51) Int. Cl.
*B60L 1/02* (2006.01)

(52) U.S. Cl. .................. 219/203; 219/522; 219/541; 219/543

(58) Field of Classification Search ........... 219/203, 219/522, 543, 541; 29/611
See application file for complete search history.

(56) References Cited

U.S. PATENT DOCUMENTS 4,786,784 A * 11/1988 Nikodem et al. ........... 219/543
5,434,384 A * 7/1995 Koontz ....................... 219/203

FOREIGN PATENT DOCUMENTS

EP 0524537 1/1993

\* cited by examiner

*Primary Examiner*—Robin O. Evans
*Assistant Examiner*—Vinod Patel
(74) *Attorney, Agent, or Firm*—Oblon, Spivak, McClelland, Maier & Neustadt, P.C.

(57) ABSTRACT

A heated window with an electrically conducting surface coating that may be electrically connected as a heating element to a voltage source using a first and a second current-collecting rail and that is split into a first part, a heated look-through region, and a second part, an additional heated region. In the heated window at least two current-collecting rails are arranged in the additional heated region so that the direction in which the current flows in the additional heated region is roughly perpendicular to the direction in which the current flows in the heated look-through region.

26 Claims, 2 Drawing Sheets

HEATED PANE WITH AN ELECTRICALLY-CONDUCTIVE SURFACE COATING

Figure 1:
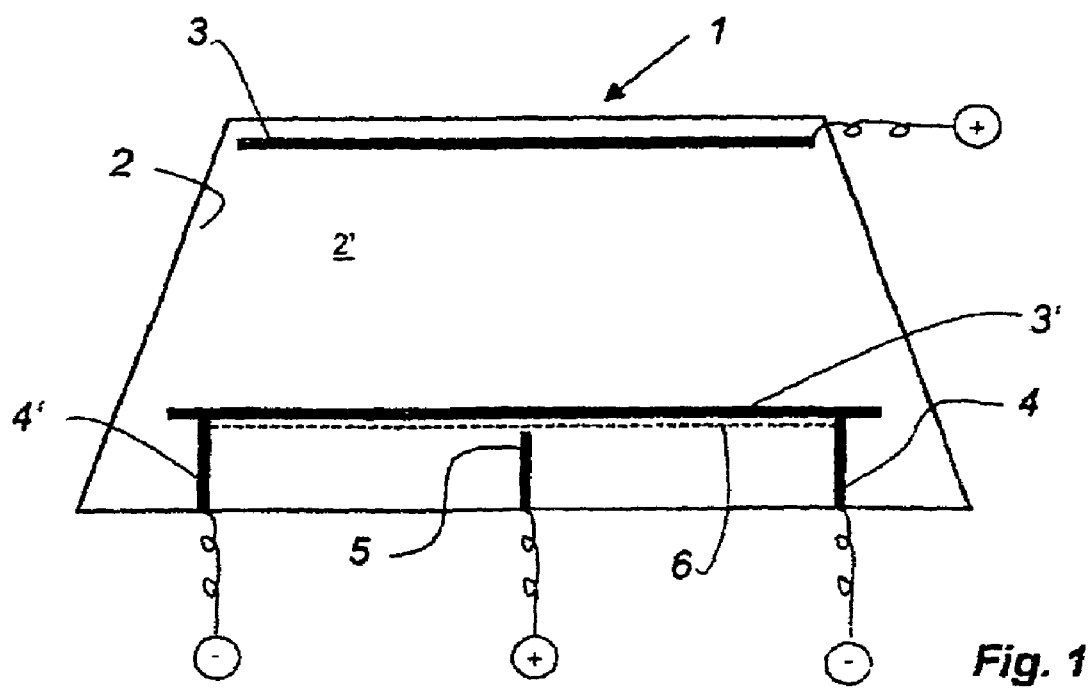

The invention relates to a heated window apparatus.

Heated windows are often used as windshields in motor vehicles. In this case, the transparent surface coating acting as a heating element, which for example involves a multi-layer system with an electrically conducting metal layer (conducting layer or heated layer), is advantageously protected against mechanical and atmospheric influences by placing it inside a composite, for example inside a laminated window. In a particularly advantageous way, the transparent surface coating lies directly on the surface of one of the two individual panes that form the laminated window, which pane is joined to the other individual pane by an interlayer made of transparent plastic, such as polyvinyl butyral (PVB). Such a heated laminated window, in which the transparent heated layer and the current inlet conductors lie inside the laminated window is known, for example, from document DE 36 44 297 A1.

The transparent conducting layer may, however, also be made up of a layer of electrically conducting oxide, such as tin oxide or indium tin oxide, just as windows provided with a transparent heated layer in which the transparent electrically conducting surface coating lies on an additional film inside the composite are known.

To introduce heating current into the layer, use is usually made of current-collecting rails in the form of strips, which as a general rule are made of a conducting silver compound of the enamel type, usually baked before the heated layer is deposited. If use is made of layer systems known as flexible layers, which are well able to withstand the high temperatures used in the bending of windows, then the current-collecting rails can also be printed after coating and then be baked. Often, strips of metal film are also placed on these current-conducting rails and these lower the electrical resistance of the current-conducting rails so as to avoid voltage drops within the current-conducting rails. A heated window of this kind is disclosed, for example, in document DE 39 37 346 A1.

In electrically heated windows of rectangular or roughly rectangular shape with a transparent surface coating as their heated element, the heating current is, as a general rule, introduced into the conducting layer via two current-collecting rails arranged parallel to one another in which these are placed along two opposite sides of the window. With such an arrangement, the heating current flows roughly uniformly through the entire heated layer, which is thus heated in total uniformly over its entire area.

In electrically heated windows the shape of which departs from a rectangular shape, a heterogeneous heating field may be created, with hotter regions and cooler regions, because the current density in the heated layer has a value that differs according to the arrangement of the electrodes and according to the local width of the heated field. For example, windshields usually employed in the automotive industry are longer at their bottom edge than their top edge, and also their height at the middle of the window may be greater than along the lateral edges. Thus, the area around the top edge of the window may be heated somewhat more than the area around the bottom edge of the window, even though it is actually along the bottom edge of the window that greater heating power is needed in order to prevent the windshield wipers located in this region from freezing in the winter. The entire heated field in this case needs to be designed to suit the minimum heating power for the bottom edge region of the window. At the same time, the upper region of the window which heats up more quickly must not, according to the legislator, exceed a surface temperature of 70° C. in service. Furthermore, there are manufacturer-specific work standards and technical delivery conditions that apply. In the example of a given automotive manufacturer, the surface temperature on the current-collecting rail and in the heated field must not exceed 50° C. after a heating time of 15 minutes.

If, with such windows the geometric shape of which is a departure from the rectangular shape, it is desired to obtain a homogeneous heated field with a roughly uniform temperature over the entire extent of the heated layer, or to heat the region of the window situated along the longer edge of the window to a greater extent, then special steps have to be taken. Document U.S. Pat. No. 2,878,357 for example discloses how to subdivide the heated layer into segments separated from one another by separation lines directed parallel to the parallel sides of a trapezoidal window, how to fit the individual segments with separate electrodes and how to apply different voltages to the electrodes of the individual segments of the layer. The great many separation lines between the individual segments of the layer within the look-through region may, however, detract from the coherence of the look of the heated window.

Another solution is disclosed in the already mentioned document DE 36 44 297 A1. In this case, the flow of current is limited to determined regions of the surface by slots in the heated layer. The absorption of power is thus reduced while at the same time achieving sufficient current density in the regions of the surface through which the current does flow to defrost or demist the window. The disadvantage with this solution is also that the slots are visible inside the look-through region and detract from the coherence of the look of the window.

Finally, document DE 692 26 955 T2 discloses a heated window in the form of a car windshield, underlying the invention, with a transparent surface coating acting as a resistive heating element and two current-collecting rails connected electrically thereto and between them flanking a heated field, in which window a third current-collecting rail is arranged parallel to the first and to the second current-collecting rails, transversely to the direction in which the current flows in the heated field, and splits the heated field into two separate heated fields. One of the two separate heated fields is in the main look-through region of the windshield, the other heated field acts as a heated element for the region in which the windshield wipers rest. This heated region is of a short height suited to its function, and the resistance between its current-collecting rails is therefore low by comparison with the resistance of the heated region of the looking-through region, which means that a higher specific power is achieved in this region of the window. If the two heating circuits are powered with the same voltage, overheating may, however, occur in the region in which the windshield wipers rest.

In trapezoidal geometric shapes, the invention described here is also looking at window glass developments which have circular ring portions or portions of shapes similar to circular rings, the radii of which have different central points. To a first approximation it is possible, for all these geometric shapes, to start out with a trapezium the non-parallel sides of which are the same length.

The object of the invention is to offer a heated window with a transparent surface coating used as a resistive heating element, the heating power of which can be adjusted in a locally differentiated way.

According to the invention, the heated window with an electrically conducting surface coating, which may be electrically connected as a heating element to a voltage source using a first and a second current-conducting rail and which is split into a first part (additional heated region), is characterized in that at least two other current-collecting rails are arranged in the additional heated region such as to be roughly perpendicular to the collecting rails of the heated look-through region.

In an advantageous embodiment of the heated window according to the invention, the current-collecting rail separating the two heated regions (looking-through region and additional heated region) from one another has at least one roughly perpendicular elbowed continuation which acts as a current-collecting rail for the additional heated region. The aforementioned current-collecting rails are then electrically connected together and are then also connected to a source of electrical power by a common electrical supply. In this way, it is possible to make a saving of one electrical supply either of the current-collecting rail of the looking-through region or of that of the additional heated region.

According to one feature, at least one $2^{nd}$ current-collecting rail is arranged roughly perpendicular to the current-collecting rail separating the two heated regions from one another, without coming into electrical contact therewith.

When the distance and therefore resistance of connection between its current-collecting rails is too great to be able to produce a predetermined heating power, the additional heated region may be split into two or more than two heated regions. For this, a number of pairs of current-collecting rails corresponding to the number of heated regions is arranged inside the additional heated region. It is, however, also possible to electrically power two adjacent heated regions along their contiguous sides by means of a common current-collecting rail. In this case, the direction in which the current flows changes from each contiguous heated region to the next.

The individual heated regions are preferably connected to voltage sources with an identical voltage which makes it possible, particularly when the heated window according to the invention is used in motor vehicles, to significantly simplify the on-board electrical network. The heating power in the additional heated region may be tailored practically as desired by means of individual heated regions.

As a preference, the continuous coating, deposited uniformly across the entire surface of the window, is split between the looking-through region and the additional heated region, so as to avoid short-circuits between the current-collecting rails at different electric potentials. The surface coating may be split in several known ways into two resistive heating elements electrically separated from one another, for example mechanically using a grinding tool. It is also known practice for a separating agent to be applied, before the surface coating is deposited, in the region of the desired line of separation, to which agent the layer-form heating material does not adhere, so that it can be brushed off locally after the coating operation. As a preference, the separating line is, however, produced using a laser beam because this method makes it possible to produce a particularly fine separating line, barely perceivable to the human eye.

When the current-collecting rails have not to be visible, for esthetic regions, they may be hidden by means of an opaque colored layer. Usually, vehicle windows are already provided with an opaque edge coating in the form of a surround, which serves as anti-UV protection for the assembly bonded to a bodywork flange. This surround may just as well cover the current-collecting rails arranged in the region of the upper edge of the heated window and protect them from sight from the outside. If the additional heated region is not covered by other components and it is not desired for it to be seen, the width of the edge coating in the lower region of the heated window may, for example, be increased so that the entirety of the additional heated region and its associated current-collecting rails and the lower current-collecting rail of the heated field of view are covered. Of course, the additional heated region may just as easily be covered with sufficiently opaque colours, independently of the edge coating in the form of a surround. With additional colored layers, the current-collecting rails can in the same way be prevented from being seen from the inside.

The heated window according to the invention may be a monolithic glass or plastic window, if the surface coating is well enough able to withstand the ambient influences and mechanical attacks, or if it is coated with a corresponding protective layer. As a preference, the heated window is, however, made up of a laminate comprising two or more than two glass and/or plastic panes which are joined together by means of an adhesive layer, for example made of polyvinyl butyral. The surface coating may be applied to one of the main faces of the pane or to an additional functional film, in which case it is usually arranged inside the laminate. The nature of a surface coating does, however, remain preserved, even on the inside of the laminate, because one surface of one of the layers of the laminate is still coated.

Other details and advantages of the subject of the invention are set out, with no intention to restrict, in the appended drawings of one exemplary embodiment and in the detailed description thereof which follows.

Figure 2:
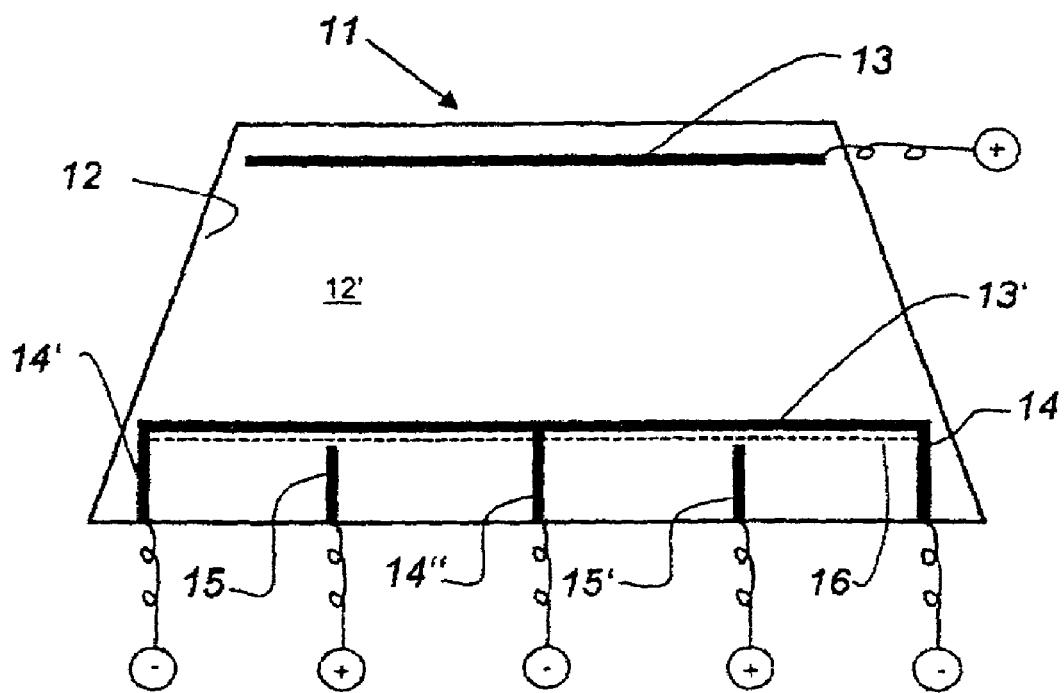
Figure 3:
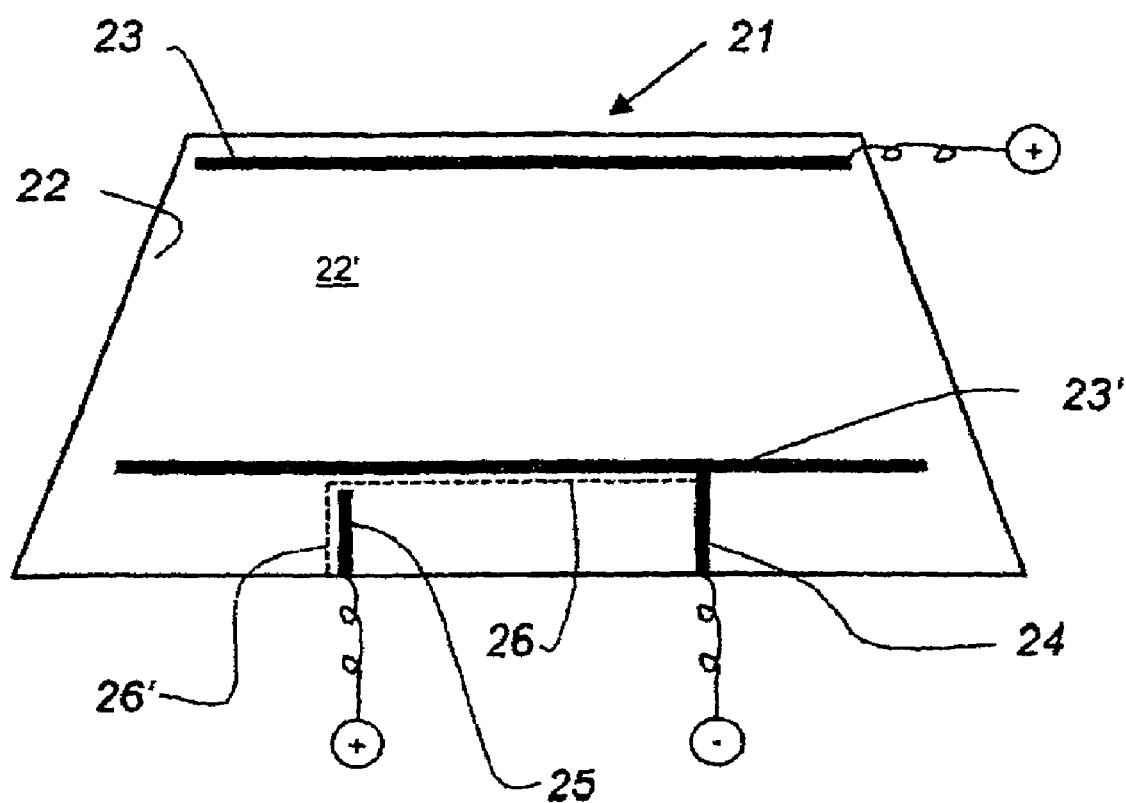

In these drawings, which are simplified depictions not drawn to any particular scale, FIG. 1 illustrates a first embodiment of a heated window according to the invention with an additional heated region split into two;

FIG. 2 depicts a second embodiment with an additional heated region split into four heated fields; and FIG. 3 shows one embodiment of the heated window according to the invention with an additional heated region made up of just one heated field.

FIG. 1 depicts a heated window 1 which is made up of a trapezoidal pane 2. A transparent and electrically conducting surface coating 2' extends over the entire surface of the window pane 2. Usually, the specific resistance of such a thin layer acting as a heating element is about 4 Ω/□. Along the top edge of the window 2 there is a current-collecting rail 3 which is connected to the positive terminal of an electrical power source, not depicted. A second current-collecting rail 3' is arranged in the region of the bottom edge of the window 2. The coated looking-through region of the heated window 1 extends over about ⅘ of the height of the window between the current-collecting rails 3 and 3'. At each of the two ends of the current-collecting rail 3' there is another current-collecting rail 4 and 4' respectively, leading as far as the bottom edge of the window 2, which rails are electrically connected to the current-collecting rail 3'. The current-collecting rails 3' and 4, and 3' and 4', respectively, make an angle of between 45 and 135° C., preferably of about 90°. The current-collecting rails 4 and 4', here roughly perpendicular to the collecting rail 3', are each connected to the ground of the power source and at the same time act as electrical connectors for the current-collecting rail 3' which is thus also connected to the ground terminal. It is also possible, in many cases, to dispense with the connecting of one of the two current-collecting rails 4 or 4' to the power source if the voltage drop along the current-collecting rail 3' does not exceed a certain limiting value. At the middle of the bottom edge and perpendicularly thereto, another current-collecting rail 5 enters the face of the window towards the current-collecting rail 3', but without coming into electrical contact therewith. The current-collecting rail 5 is connected to a positive terminal of the electrical power source. A partial heating field of the additional heated region is formed between the current-collecting rails 4 and 5 on the one hand, and 5 and 4' on the other, the directions in which the current flows in these partial heated fields being turned through 180° from one to the next and being perpendicular to the direction in which the current flows in the heated looking-through region. The current-collecting rails may, for example, be made in a color containing silver, which has been printed onto the window pane before or after the surface coating is deposited.

Between the current-collecting rail 5 and the current-collecting rail 3' there is a separating line 6 which electrically separates the additional heated region from the coated main face of the heated window 1. In this particular instance there is no need to extend the separating line right up to the lateral edges of the window 2, if the outer current-collecting rails 4 and 4' are at the same potential as the inner current-collecting rail 3' of the heated field of view.

The surface heating in the looking-through region and in the additional region may, if need be, be achieved using different voltages even though they are connected to a common ground conductor. It is also possible to operate the heated regions independently of one another and therefore to operate either just the additional heated region or just the heating element for the looking-through region, or to operate both sets of heating at the same time.

FIG. 2 shows an arrangement similar to FIG. 1, the additional heated region has simply been split into four heated fields. The current-collecting rail 13' therefore has three branches leading toward the lower edge of the window, which branches are connected to the ground terminal in the form of current-collecting rails 14, 14' and 14". The fields formed by the branches are split by current-collecting rails 15 and 15' which are connected to the positive terminal of a power source.

Finally, in FIG. 3, the window 21 is equipped with an additional heated region consisting of just one heated field. A greater extension of the additional heated region is for example not necessary when the windshield wipers of a vehicle have their position of rest only in a limited region along the lower edge of the heated window 21. This is, for example, the case when a vehicle is equipped with opposed-sweep windshield wipers which are arranged one above the other in their position of rest, or when there is just one windshield wiper. The position of the single heated field may of course also be offset asymmetrically with respect to the vertical axis of symmetry of the window 21, depending on the position of rest of the windshield wiper or wipers.

With an odd number of heated fields, the current-collecting rail 25, the electrical potential of which admittedly differs from that of the current-collecting rail 23' belonging to the heated element of the looking-through region of the window 21, must, however, be electrically separated from the surface coating deposited on the entire surface of the window 21, using another separating line 26'.

The windows 1, 11 or 21 can be used directly in the form of monolithic windows, if the surface coating and the current-collecting rails and the connections are sufficiently able to withstand the chemical and mechanical influences. As a general rule, however, such windows are used in a laminate comprising another pane made of glass or plastic. The other pane may then be provided with a deposit in the form of a surround of an opaque color, which hides all the current-collecting rails and the region of the additional heated region, in such a way that no current inlet is visible when looking from the outside. Usually, the edge regions have also, to a certain extent, to be free of conducting layer, because, on the one hand, this conducting layer is sensitive to corrosion and must therefore not be in contact with the ambient (wet) air and, on the other hand, because it is necessary to avoid short-circuiting with the bodywork which is usually made of metal.

The invention claimed is:

1. A heated window comprising:
   an electrically conducting surface coating configured to be electrically connected as a heating element to a voltage source using a first and a second current-conducting rail and which is split into a first part and a second part; and
   at least two other current-conducting rails arranged in the first part, at least one current-conducting rail being electrically connected to the second current-conducting rail splitting the two parts and being roughly perpendicular to said second current-conducting rail, and at least one other current-conducting rail arranged from a first end to a second end towards the second current-conducting rail splitting the parts without entering in contact with the second current conducting rail.

2. The heated window as claimed in claim 1, wherein the second current-conducting rail and at least one other roughly perpendicular current-conducting rail are electrically connected together to form a common current input to the second part and the first part.

3. The heated window as claimed in claim 1, wherein at least one additional current-conducting rail is arranged roughly perpendicular to the second current-conducting rail without coming into electrical contact therewith.

4. The heated window as claimed in claim 1, wherein the first part is split into plural heated regions.

5. The heated window as claimed in claim 4, wherein the current-conducting rails arranged inside the first part act as a current-conducting rail common to two adjacent heated regions.

6. The heated window as claimed in claim 1, wherein the electrical circuits for the second part and the first part are connected to power sources at a same voltage.

7. Heated window as claimed in claim 1, wherein the first part is, at least in regions, electrically separated from the second part by a separating line.

8. The heated window as claimed in claim 7, wherein the separating line is produced by laser machining.

9. The heated window as claimed in claim 1, wherein the first part is protected against sight from an outside and/or from an inside by a colored layer.

10. The heated window as claimed in claim 1, wherein the heated window is provided with a colored layer in a form of a surround.

11. The heated window as claimed in claim 1, wherein the heated window is made as a laminated window.

12. The heated window as claimed in claim 11, wherein the laminated window includes two rigid panes, and a thermoplastic adhesive layer joining the two rigid panes together.

13. The heated window as claimed in claim 12, wherein the two rigid panes are glass panes.

14. A heated window comprising:
- a first current-conducting rail extending only along one side of said window;
- a second current-conducting rail extending parallel to said first current-conducting rail and dividing said window into a first part and a second part;
- an electrically conducting surface coating configured to be electrically connected as a heating element to a voltage source connected between said first and second current-conducting rails; and
- at least two other current-conducting rails arranged in the first part to be roughly perpendicular to the second current-conducting rail.

15. The heated window as claimed in claim 14, wherein the second current-conducting rail and at least one other roughly perpendicular current-conducting rail are electrically connected together to form a common current input to the second part and the first part.

16. The heated window as claimed in claim 14, wherein at least one additional current-conducting rail is arranged roughly perpendicular to the second current-conducting rail without coming into electrical contact therewith.

17. The heated window as claimed in claim 14, wherein the first part is split into plural heated regions.

18. The heated window as claimed in claim 17, wherein the current-conducting rails arranged inside the first part act as a current-conducting rail common to two adjacent heated regions.

19. The heated window as claimed in claim 14, wherein electrical circuits configured to provide current to heat the first part and the second part are connected to a same voltage.

20. The heated window as claimed in claim 14, wherein the first part is, at least in regions, electrically separated from the second part by a separating line.

21. The heated window as claimed in claim 20, wherein the separating line is produced by laser machining.

22. The heated window as claimed in claim 14, wherein the first part is protected against sight from an outside and/or from an inside by a colored layer.

23. The heated window as claimed in claim 14, wherein the heated window is provided with a colored layer in a form of a surround.

24. The heated window as claimed in claim 14, wherein the heated window is made as a laminated window.

25. The heated window as claimed in claim 24, wherein the laminated window includes two rigid panes, and a thermoplastic adhesive layer joining the two rigid panes together.

26. The heated window as claimed in claim 25, wherein the two rigid panes are glass panes.

* * * * *